J. H. CHRISTIAN.
TIRE.
APPLICATION FILED FEB. 8, 1915.

1,228,650. Patented June 5, 1917.

Witnesses
Chas. W. Stauffiger
Anna M. Dorr

Inventor
James H. Christian
By
Attorneys

UNITED STATES PATENT OFFICE.

JAMES H. CHRISTIAN, OF DETROIT, MICHIGAN, ASSIGNOR TO PERFECTION TIRE & RUBBER CO., A CORPORATION OF SOUTH DAKOTA.

TIRE.

1,228,650.

Specification of Letters Patent.

Patented June 5, 1917.

Application filed February 8, 1915. Serial No. 6,739.

*To all whom it may concern:*

Be it known that I, JAMES H. CHRISTIAN, a citizen of the United States of America, residing at Detroit, in the county of Wayne and State of Michigan, have invented certain new and useful Improvements in Tires, of which the following is a specification, reference being had therein to the accompanying drawings.

This invention relates to the art of manufacturing tires for automobile and other vehicles, and has special reference to an improvement in the construction of such tires, whereby the same shall possess, to the highest degree attainable, a maximum strength, integrity, resiliency and endurance, together with maximum resistance against perforation.

Another and distinct object of this invention is to provide a novel construction of vehicle tire built up in such a manner as to not only effect a great saving of rubber, but at the same time to secure an exceptionally thick taut and cushioned body and tread, producing a casing of great strength and wearing capacity, and particularly obviating the possibility of "blow outs" resulting from high internal pneumatic pressure, and also, at times, from the injury termed "stone bruise."

One of the necessities of the art of tire construction is to provide surfaces or laminations that will admit, receive and retain rubber to the greatest penetrating or bonding limit, thereby binding, as thoroughly as can be done, the whole tire when completed or vulcanized into one homogeneous integral body, and at the same time to have the tire structure built up in a manner and of a material that will give the greatest strength and flexibility. These necessities are entirely supplied by the present invention with the result of providing a construction which will produce a tire body or carcass and tire tread capable of withstanding the wear, tear, and strain imposed upon pneumatic tires in the ordinary use thereof upon motor and other vehicles.

A further object of this invention is to provide an effective reinforcement or breaker strip for tires that will not deteriorate by the action of heat or cut into the body of the tire, but will increase the tensile strength of the entire structure.

With these and many other objects in view, which will more readily appear as the nature of the invention is better understood, the same consists in the novel construction, combination and arrangement of parts hereinafter more fully described illustrated, and claimed.

Reference will now be had to the drawings, wherein—

In a tire which embodies the leading characteristics of my invention there is necessarily present a carcass or body 1. The body or carcass 1 is composed of layers or laminations of durable canvas. The edges of the body or carcass terminate in clencher or straight side members 3.

Figure 3:
Fig. 3 is an enlarged detail view of an interwoven element of the breaker strip.

On the body or carcass 1 is a breaker strip composed of cold rolled woven wire and asbestos or sea island cotton, or a combination of all three. The cold rolled woven wire is practically impenetratable and the strands of wire, designated 4, are incased with the asbestos or sea island cotton, as best shown in Fig. 3. The asbestos is not susceptible to heat and when sea island cotton is used the cotton adds strength and flexibility to the strip and coöperates with the strands of wire in forming a pervious structure capable of being impregnated with pure rubber. The pure rubber is designated 5 and fully incloses the interwoven structure. It provides a sheet having tapering edges 6 that extend in proximity to the clencher or straight side members 3 of the carcass 1.

Figure 2:
Fig. 2 is a similar view of a breaker strip.

The breaker strip thus produced is shown in Fig. 2 as a unitary structure and when in such form it can be easily placed upon the carcass 1 and then inclosed by a rubber tread 7.

The fabricated or laminated structure thus produced is now ready to be vulcanized and when subjected to such action, the pure rubber 5 impregnates the carcass 1 and joins the breaker strip to the carcass and the tread 7, in such a manner as to provide a homogeneous integral body. The pure rubber inclosing the breaker strip not only serves as a binder but as a yieldable and elastic connection between the carcass and the tread, thereby adding a degree of resiliency to the tire that will coöperate with an inner tube in increasing the road worthiness of the tire structure.

Figure 1:
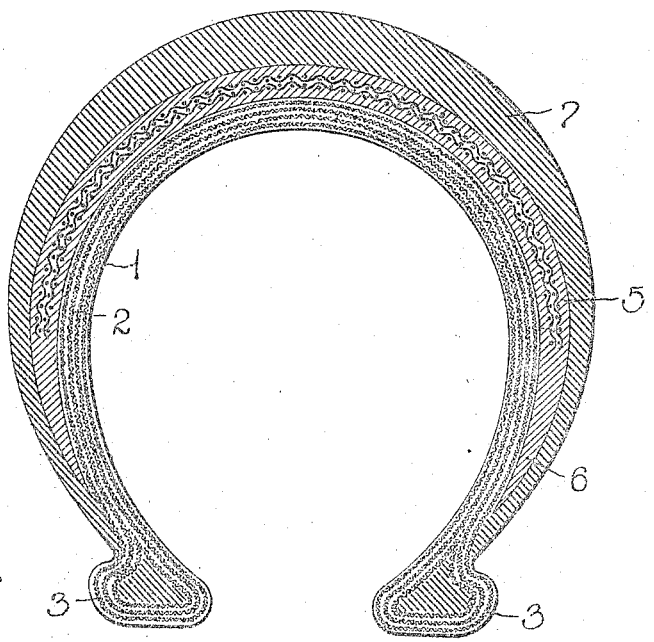
Figure 1 is a cross sectional view of the tire.
Figure 4:
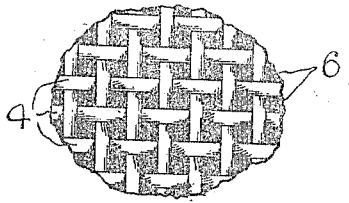
Fig. 4 is a plan of a portion of the interwoven element.

By reference to Fig. 4 it will be noted that the pure rubber enters the interstices of the interwoven strip, consequently the individual strands of the strip are embedded in the rubber and firmly held thereby.

From the foregoing it will be observed that I have devised a unitary breaker strip that can be easily and quickly installed between the carcass and tread and vulcanized therein to provide a tire that possesses many advantages over the present type of vehicle tire.

What I claim is:—

In a tire, a carcass, a tread, a rubber cushion between said carcass and said tread and uniting the same to form an outer casing, layers of wire in said rubber cushion with each wire inclosed by a heat resisting material, the inclosed wires being interwoven with spaces between confronting faces thereof so that the rubber from which the cushion is formed may enter the spaces between the inclosed wires and yieldably cushion said wires relative to one another, said embedded wires terminating at a point removed from the side edges of the rubber cushion so as to preclude cutting therethrough when said casing is subjected to pressure.

In testimony whereof I affix my signature in presence of two witnesses.

JAMES H. CHRISTIAN.

Witnesses:
ANNA M. DORR,
KARL H. BUTLER.